April 7, 1964     D. W. GROOM     3,128,331
BARE WIRE TRANSMISSION ARRANGEMENT
Filed June 5, 1962     2 Sheets-Sheet 1

INVENTOR.
David W. Groom.
BY
ATTORNEYS.

April 7, 1964    D. W. GROOM    3,128,331
BARE WIRE TRANSMISSION ARRANGEMENT
Filed June 5, 1962    2 Sheets-Sheet 2

INVENTOR.
David W. Groom.
BY
*F. Lehr and Swain.*
ATTORNEYS.

3,128,331
BARE WIRE TRANSMISSION ARRANGEMENT
David W. Groom, 115 Mill Creek Drive, Willits, Calif.
Filed June 5, 1962, Ser. No. 200,200
2 Claims. (Cl. 174—43)

This invention relates to transmission lines and more particularly to those transmission means incorporating open or bare conductors exposed to the atmosphere. The invention is particularly useful in providing a closed circuit television system as with so-called "community antennas."

"Community antennas," as used to receive television signals in remote areas, are usually located upon a high vantage point near the community to be served. Broadcasted signals received by the antenna are in turn retransmitted by cable to individual locations, such as residences, and the like. "Coaxial" cable has been used for this retransmission notwithstanding some substantial expense involved. Considerably less expensive bare wire conductor systems have been tried but involve the problem that deposits of contaminants from the surrounds, such as dirt, salt from salt air, and the like accumulate on the cable-supporting insulators and tend to cause objectionable variations in impedance between the supported conductors. Addition of moisture to the deposited contaminants aggravates the problem severely.

Accordingly, an object of the invention is the provision of an improved signal transmission system relying on uninsulated conductors.

Another object of the invention is a signal transmission system including cable support means, wherein the impedance between supported uninsulated conductors is maintained constant.

Further objects and features of the invention will appear from the following description in which a preferred embodiment has been set forth in detail in conjunction with the accompanying drawings.

Referring to the drawings.

Figure 1:
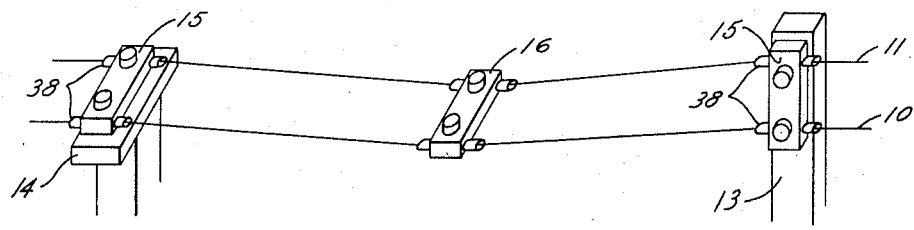
FIGURE 1 shows a portion of an open wire cable system using bare wires.
Figure 2:
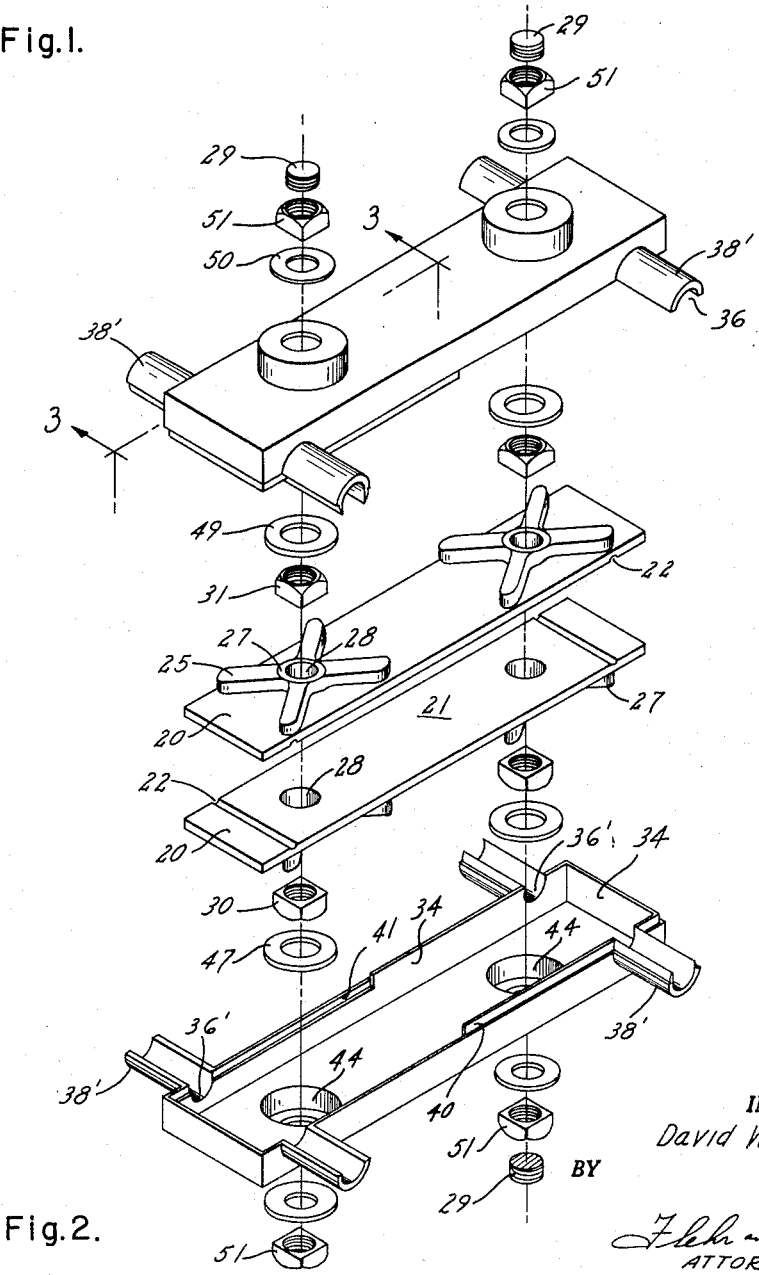
FIGURE 2 is an exploded perspective view of my cable support structure.
Figure 3:
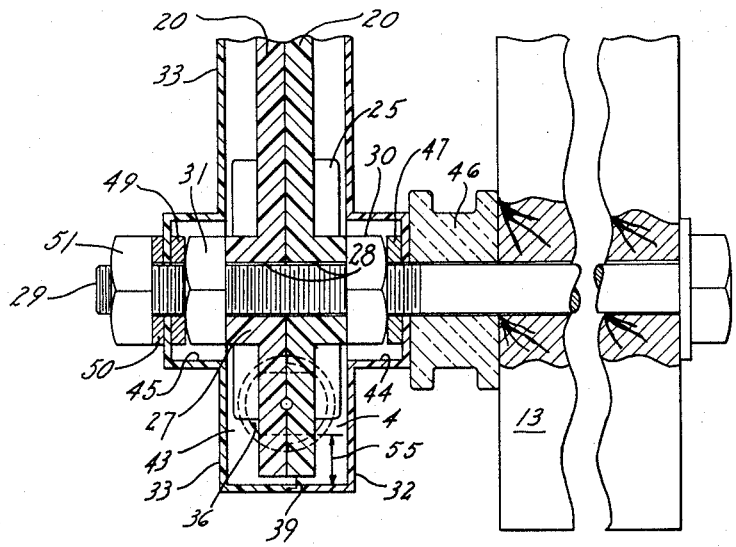
FIGURE 3 is an assembled section taken along the line 3—3 of FIGURE 2.

As shown in FIGURE 1, my transmission arrangement includes a pair of uninsulated wires 10, 11 strung from poles as 13, or from a yardarm 14 thereof. The arrangement further includes means 15 for supporting the wires 10, 11 insulated from the poles, or spaced apart in mid-span 16, in a manner whereby the impedance between wires 10, 11 remains substantially unaltered by deposits of environmental contaminants, as may be found for example in areas neighboring cement plants or in coastal regions where salt air tends to apply a coating of salt to exposed objects.

My conductor support means generally includes a conductor support block rigidly fixed to a pole to hold the wires firmly, and a specially constructed cover forming an envelope spaced around the support block. The support block is comprised of two insulator members 20, each having a flat face 21 provided with grooves 22 extending across each end region. By placing the faces 21 together, grooves 22 register to form holes through the "conductor support block" thus formed. The holes can then hold a pair of uninsulated wires tightly therebetween. Each member 20 is strengthened by an X-shaped reinforcement 25 formed on the backside and having an annular boss 27 located at the intersection in each X. Bolt holes 28 are drilled through bosses 27 for clamping the two members 20 together. Thus, when suitable bolts 29 are used, a pair of nuts 30, 31 can be used to compress the end regions of members 20 with considerable force to clamp an uninsulated wire therebetween. Members 20 can be made in any suitable manner, such as by molding from a dielectric plastic.

The cover construction for providing an envelope around the conductor support block is formed from two sections 32, 33. Each section is formed with a hollow interior or recess to provide a raised peripheral edge 34. The edges of the two sections 32, 33 when placed together form an envelope around the clamped support members 20. The envelope is dimensioned large enough so as to space the interior cover surfaces clear of members 20 to provide a void therebetween.

In order to accommodate the passage of wires 10, 11 through the cover, openings 36 are formed in coaxial registration with grooves 22. To protect the openings 36, a tubular shield 38 is provided to extend from each in substantially coaxial relation along and spaced from wires 10, 11. The tubular shields 38 are formed from semi-cylindrical portions 38' extending out from the margin around each semi-circular opening 36'. The edges of sections 32, 33 are arranged to provide an overlapped, weather tight and shear resistant seam 39. Thus, in each cover section there is a male stretch which includes a raised lip 40 extending along a first edge portion and a female stretch 41 of relieved edge thickness which extends along a second edge portion. Inasmuch as both cover sections 32, 33 are the same (in order to require only a single mold), the periphery of each is divided equally male and female. Thus, with the edges overlapping, a weather tight seam is formed. The seam further includes the tubular shields 38 as well.

Finally, each cover section 32, 33 includes cylindrically-shaped recesses 44, 45 respectively to accommodate a washer and nut having an aggregate thickness slightly greater than the inside axial extent of the recess so as to insure provision of a void 43 between the support block surfaces and the cover.

When assembling the foregoing cable support arrangement, it is preferred to run a pair of bolts 29 through the pole or yardarm and provide a pair of stand-off insulators 46, for example of ceramic material, on each. One cover section 32 can then be positioned upon the bolts and a spacing washer 47 and nut 30 added in each recess 44. The torsion applied to nuts 30 need only be somewhat greater than finger tight, since the cable being strung is primarily held by the support block members 20. For this reason the cover can be fabricated of very light weight material.

Next, members 20 are placed in position with a bare wire through each hole as formed by grooves 22. Nuts 31 are added and screwed down tightly against the resistance of nuts 30. Thus, cover section 32 is not squeezed by the compression of the means clamping wires 10, 11 to the wire support block.

Spacing washers 49 are placed on bolts 29 before section 33 is added, and then, in order to seal the bolt holes, a washer 50 and nut 51 are positioned with a moderate applied torque.

The enveloping void around the support block functions to minimize, if not to preclude for all practical purposes, environmental contaminants settling on the support block surfaces in amounts sufficient to vary the impedance between the cable wires 10, 11. The openings 36 function to drain away any accumulated precipitation before it can rise to a level which would contact either one of the wires, regardless of how the structure is oriented. Thus, in its preferred vertical orientation, for example, the low end of the cover provides a sump 55 located in a path gravitationally between the conductors.

Accordingly, should rain enter the cover by way of either a lower or upper shield 38, it will run down the inside of the cover to a sump portion such as 55 and eventually drain off over the "sill" of the lower most opening 36 before rising to a level which would make contact with a wire 10, 11.

Figure 4:
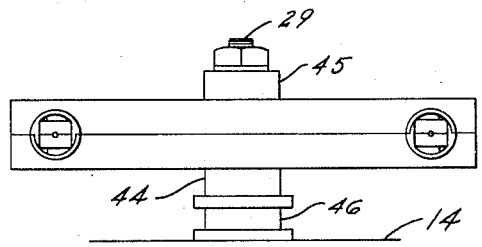
FIGURE 4 shows another embodiment of the cable support structure.

Another embodiment arranged to use only a single bolt for support is shown in FIGURE 4. In other respects, the parts thereof are the same as described in detail above.

Therefore, while there have been shown and described and pointed out the fundamental novel features of the invention as applied to the preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. In an open wire transmission system the combination comprising in combination a plurality of uninsulated conductors, poles disposed for stringing said conductors therebetween, and an insulator structure on each of said poles to support said conductors therefrom, said insulator structure comprising a conductor support block of dielectric material, said block including means adapted to hold a plurality of uninsulated conductors in spaced apart relation to establish a predetermined impedance therebetween, said block being formed in two halves, and means for compressing said halves together to hold said conductors, a cover forming a closed envelope around said support block, means spacing said block free of the interior surfaces of said cover to provide a void around said block, said cover including openings dimensioned and disposed to pass conductors clear of and through said cover, insulator means interposed between said cover and a pole associated therewith, and clamping means holding said insulator structure, insulator means and pole together with an applied compressive force independent of the compressive force holding said block halves clamped together, said clamping means further serving to support said block, whereby deposits of environmental contaminants upon said block are minimized thereby maintaining said predetermined impedance substantially constant.

2. In a bare wire transmission system for transmission of R.F. signals, in combination a plurality of bare wire conductors, poles disposed for stringing conductors therebetween, and an insulator structure on each of said poles to support said conductors therefrom, each of said insulator structures comprising a pair of bolts carried by said poles, a conductor support block of dielectric material carried by said bolts, said block being formed in two halves, each half being carried by said bolts, nuts on said bolts serving to compress said halves together to hold said conductors tightly therebetween, a cover formed of two cover halves to provide a completely closed envelope around said support block, said cover including openings dimensioned and disposed to pass conductors clear of and through said cover, said openings providing the only access between the inside of said envelope and the surrounds, each cover half including recesses formed to accommodate said nuts, spacing washers carried by said bolts between the block and the interior surface of each recess, the inside axial extent along said bolts of said recesses being slightly less than the aggregate thickness of said nut and spacing washer associated therewith to insure clearance between the interior surface of said cover and the surface of said block to provide a void around said block, insulator means carried by said bolts and interposed between said cover and said pole associated therewith, clamping nuts carried by said bolts and disposed to hold said insulator structure, insulator means and associated pole together with an applied compressive force independent of the compressive force holding the block halves together, cylindrical shields fixed at one end to a margin around each of said openings and disposed to extend spaced from and along said conductors, said shields completely encircling the conductor associated therewith to substantially preclude the entry into said envelope of contaminants approaching said openings from any direction other than substantially parallel to the wire extending therethrough, whereby deposits of environmental contaminants upon said block are minimized thereby maintaining the impedance between conductors supported by said block substantially constant, notwithstanding the orientation of said insulating structure.

References Cited in the file of this patent

UNITED STATES PATENTS

| | | |
|---|---|---|
| 912,501 | Soden | Feb. 16, 1909 |
| 1,280,172 | Culligan | Oct. 1, 1918 |
| 1,429,369 | Parker | Sept. 19, 1922 |

FOREIGN PATENTS

| | | |
|---|---|---|
| 816,918 | Great Britain | July 22, 1959 |